(12) United States Patent
Lin

(10) Patent No.: US 8,934,234 B2
(45) Date of Patent: Jan. 13, 2015

(54) PORTABLE ELECTRONIC DEVICE STAND

(75) Inventor: Ying-Hao Lin, New Taipei (TW)

(73) Assignee: Good Way Technology Co., Ltd., New Taipei (TW)

( * ) Notice: Subject to any disclaimer, the term of this patent is extended or adjusted under 35 U.S.C. 154(b) by 506 days.

(21) Appl. No.: 13/450,857

(22) Filed: Apr. 19, 2012

(65) Prior Publication Data
US 2013/0279087 A1    Oct. 24, 2013

(51) Int. Cl.
*H05K 5/00* (2006.01)
*H05K 7/00* (2006.01)
*A47G 1/10* (2006.01)
*E04G 3/00* (2006.01)
*A47B 96/06* (2006.01)

(52) U.S. Cl.
USPC ............ 361/679.41; 361/679.42; 361/679.43; 361/679.44; 361/679.45; 361/679.09; 361/679.16; 361/679.59; 248/316.5; 248/292.14; 248/229.22; 292/341.17

(58) Field of Classification Search
USPC ............... 361/679.01–679.09, 679.1–679.19, 361/679.21–679.29, 679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8; 292/1–62, 113, 292/169.11–169.23, 341.11–341.19; 312/223.1, 223.2, 331; 369/75.1, 75.2, 369/75.11, 75.21, 76, 77.11, 77.21, 78, 79, 369/80, 81, 82
See application file for complete search history.

(56) References Cited

U.S. PATENT DOCUMENTS

| | | | |
|---|---|---|---|
| 6,683,786 B2 * | 1/2004 | Yin et al. | 361/679.4 |
| 8,559,172 B2 * | 10/2013 | Byrne | 361/679.41 |
| 2011/0292584 A1 * | 12/2011 | Hung et al. | 361/679.26 |
| 2012/0275092 A1 * | 11/2012 | Zhou | 361/679.01 |

* cited by examiner

*Primary Examiner* — Jerry Wu
(74) *Attorney, Agent, or Firm* — Tim Tingkang Xia, Esq.; Morris, Manning & Martin, LLP

(57) ABSTRACT

A portable electronic device stand includes a U-shaped main body having a receiving recess formed on a bottom thereof and defining a front receiving space; and a mating part including a seat portion and a back support, which together giving the mating part a substantially L-shaped configuration. The seat portion is pivotally turnably connected to and located in the front receiving space, and the back support is removably received in the receiving recess on the bottom of the main body. With the mating part pivotally turnably connected to between the U-shaped main body, the portable electronic device stand can be converted from an extended state for use into a folded state having a minimal volume for convenient storage and easy portability.

9 Claims, 7 Drawing Sheets

PORTABLE ELECTRONIC DEVICE STAND

FIELD OF THE INVENTION

The present invention relates to a portable electronic device stand, and more particularly to a portable electronic device stand that can be easily converted into a folded state to have a reduced volume for convenient storage and easy portability.

BACKGROUND OF THE INVENTION

A portable electronic device stand allows a portable electronic device put thereon, such as a mobile phone, a tablet computer and the like, to stand on a desk top, so that a user may view or operate the portable electronic device in a more convenient manner. However, conventional portable electronic device stands usually have irregular configurations and tend to have a large volume when they are designed to also provide the function of an adapter and/or a charger. The large volume prevents the conventional electronic device stands from easy storage when they are not in use. Further, with the irregular configurations thereof, the conventional electronic device stands do not have good portability and therefore fail to satisfy general consumers' requirement.

It is therefore tried by the inventor to develop an improved portable electronic device stand that, when not in use, can be folded to have a reduce volume and can therefore be conveniently stored or be easily portable.

SUMMARY OF THE INVENTION

A primary object of the present invention is to provide a portable electronic device stand that can be easily converted into a folded state having a reduced volume.

To achieve the above and other objects, the portable electronic device stand according to a preferred embodiment of the present invention includes a U-shaped main body having a receiving recess formed on a bottom thereof and defining a front receiving space; and a mating part including a seat portion and a back support, which together giving the mating part a substantially L-shaped configuration. The seat portion is pivotally turnably connected to and located in the front receiving space, and the back support is removably received in the receiving recess on the bottom of the main body.

According to an embodiment of the present invention, the back support has a through hole provided thereon.

According to an embodiment of the present invention, the seat portion has a recession provided thereon.

According to an embodiment of the present invention, the portable electronic device stand further includes anti-slip pads attached to the bottom of the U-shaped main body.

According to an embodiment of the present invention, the portable electronic device stand further includes anti-slip pads attached to a supporting surface of the back support.

According to an embodiment of the present invention, the portable electronic device stand further includes anti-slip pads attached to a carrying surface of the seat portion.

According to an embodiment of the present invention, the U-shaped main body has at least one connection port provided thereon.

According to the present invention, the connection port provided on the U-shaped main body can be a USB 3.0 port or a USB 2.0 port.

According to an embodiment of the present invention, the U-shaped main body has a power jack provided thereon.

According to an embodiment of the present invention, the U-shaped main body has at least one switch provided thereon.

Thus, with the mating part pivotally turnably connected to the U-shaped main body, the portable electronic device stand can be converted from an extended state for use into a folded state having a minimal volume for convenient storage and easy portability.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings.

Figure 1:
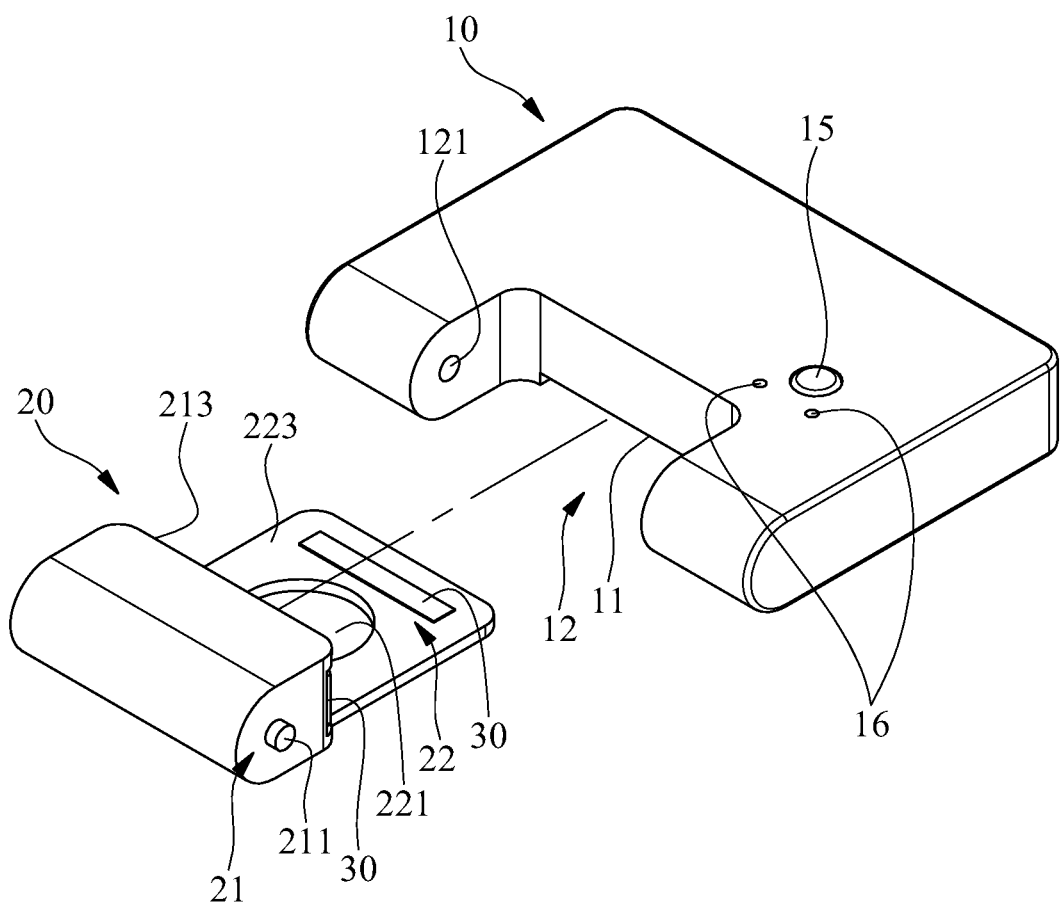
FIG. 1 is an exploded top front perspective view of a portable electronic device stand according to an embodiment of the present invention.
Figure 2:
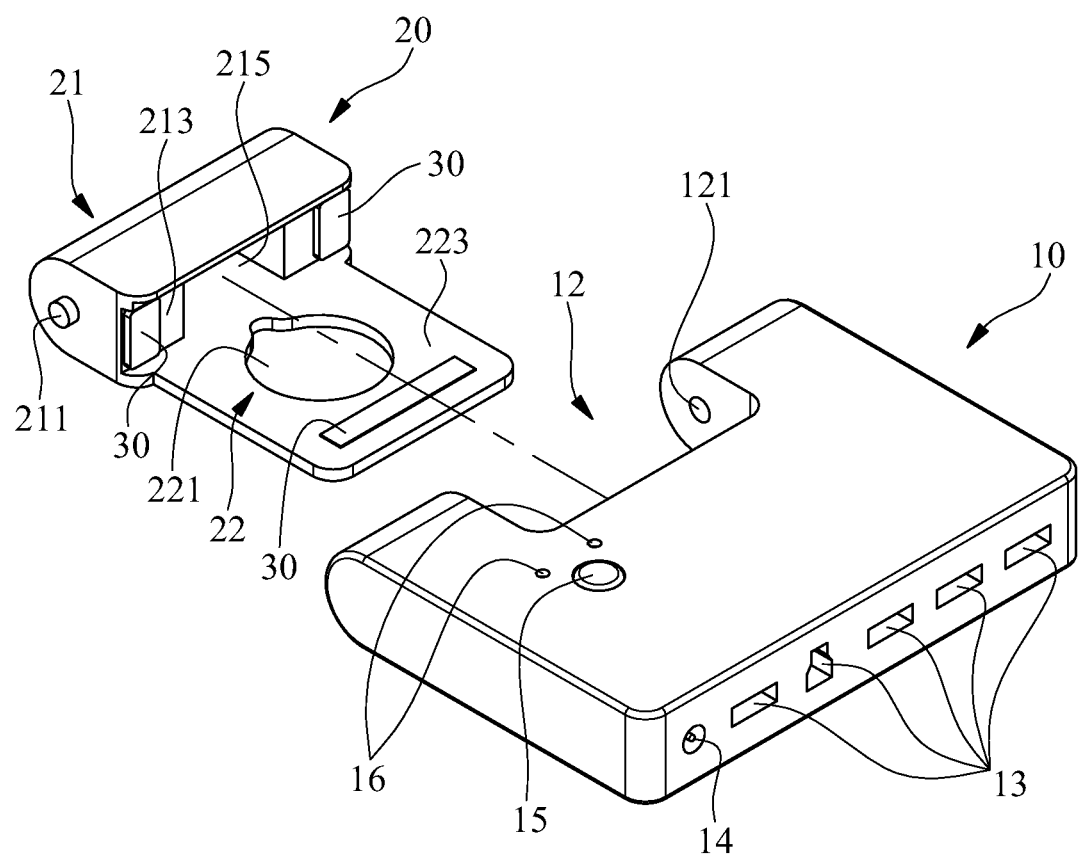
FIG. 2 is a rear view of FIG. 1.

Please refer to FIGS. 1 and 2 that are exploded top front and rear views, respectively, of a portable electronic device stand according to a preferred embodiment of the present invention. As shown, the portable electronic device stand includes a U-shaped main body 10 and a mating part 20.

Figure 6:
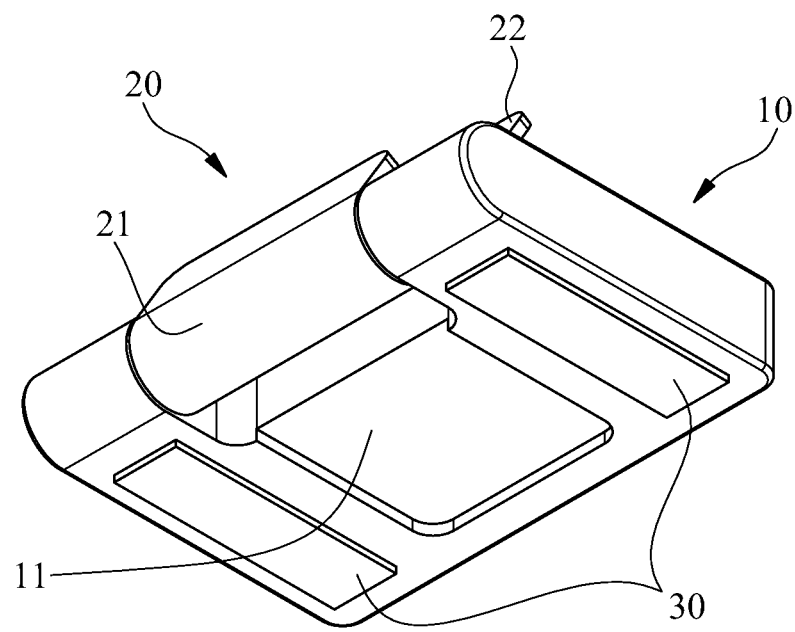
FIG. 6 is an assembled bottom front perspective view of the portable electronic device stand of FIG. 1 in an extended state.

The U-shaped main body 10 is provided on a bottom with a receiving recess 11, as can be more clearly seen in FIG. 6, and defines a front receiving space 12. The mating part 20 includes a seat portion 21 and a back support 22, which together give the mating part 20 a substantially L-shaped configuration. The seat portion 21 is pivotally turnably connected to between two lateral sides of the front receiving space 12, so that the mating part 20 and the U-shaped main body 10 can be turned relative to each other to a folded state, in which the back support 22 is received in the receiving recess 11, or to an extended position, in which the back support 22 is located atop the front receiving space 12.

The front receiving space 12 of the U-shaped main body 10 is provided on the two lateral sides with a first pivot member 121 each, and the seat portion 21 of the mating part 20 is provided on two lateral sides thereof with a second pivot member 211 each. The first pivot members 121 are correspondingly movably connected to the second pivot members 211 for the U-shaped main body 10 and the mating part 20 to rotate relative to each other. For example, the first pivot members 121 may be two pivot holes and the two second pivot members 211 may be two corresponding round pivot shafts capable of rotatably inserting into the two pivot holes, allowing the mating part 20 to rotate about a center axis of the two round pivot shafts relative to the U-shaped main body 10 between the aforesaid folded state and extended state. However, it is understood the first and the second pivot members 121, 211 are not necessarily provided in the form as shown in the illustrated embodiment, and may be exchanged in position. That is, the first pivot members 121 and the second pivot members 211 may be pivotally connected to one another in any form, so long as the mating part 20 and the U-shaped main body 10 can be rotated relative to each other into the folded state or the extended state.

Figure 3:
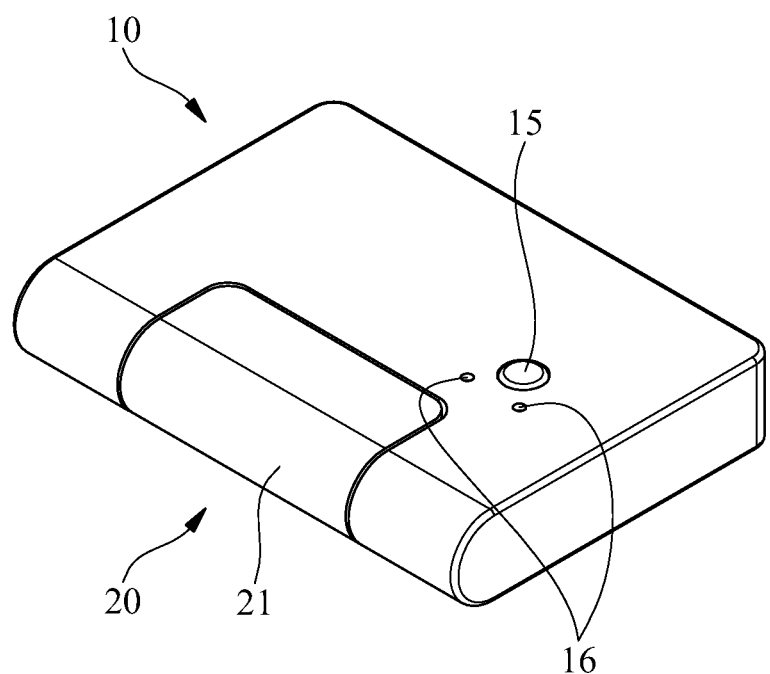
FIG. 3 is an assembled view of FIG. 1 showing the portable electronic device stand in a folded state.
Figure 4:
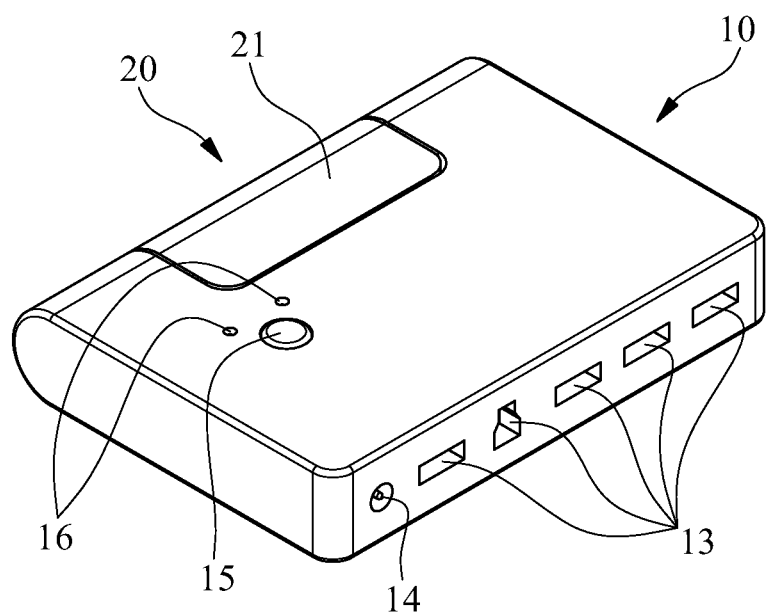
FIG. 4 is a rear view of FIG. 3.
Figure 5:
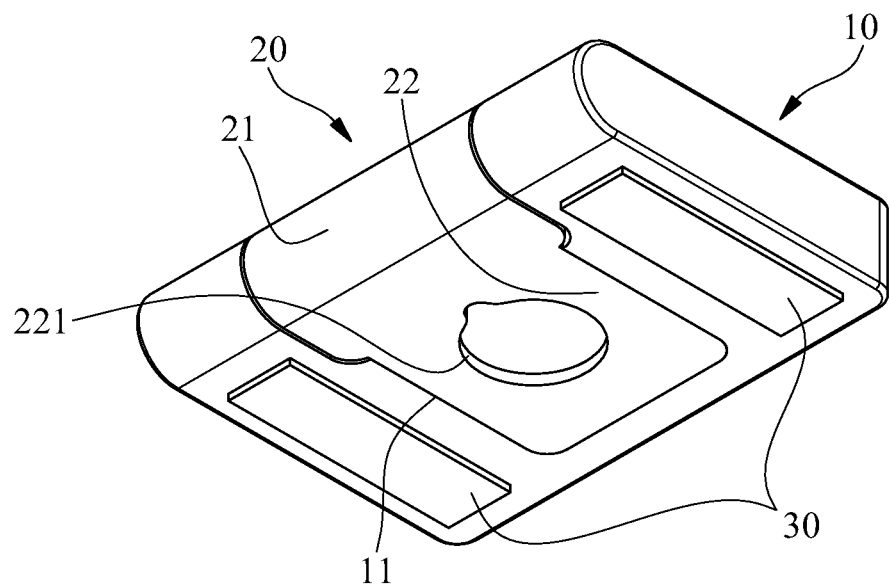
FIG. 5 is a bottom view of FIG. 3.
Figure 7:
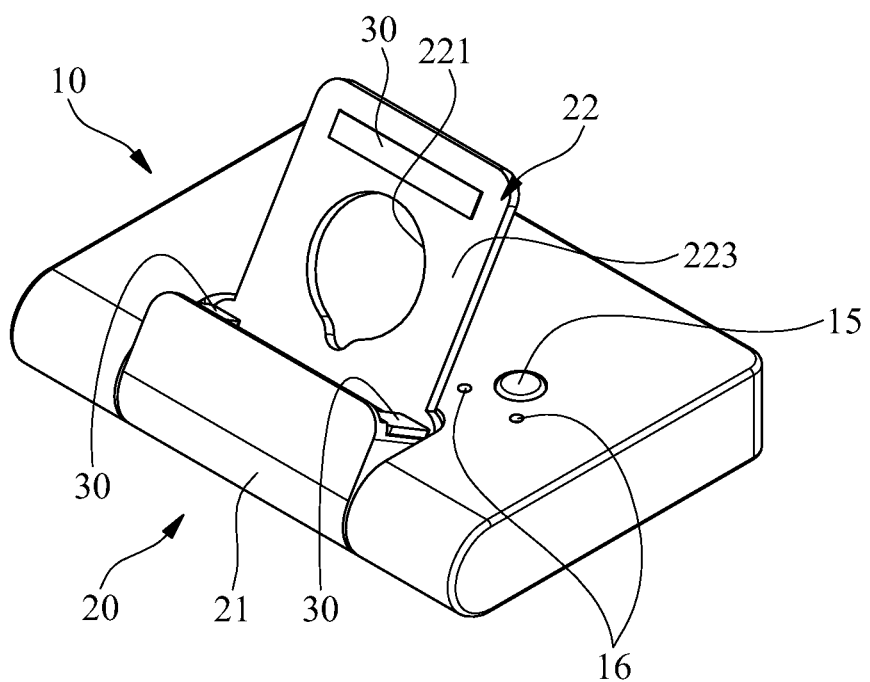
FIG. 7 is a top view of FIG. 6.
Figure 8:
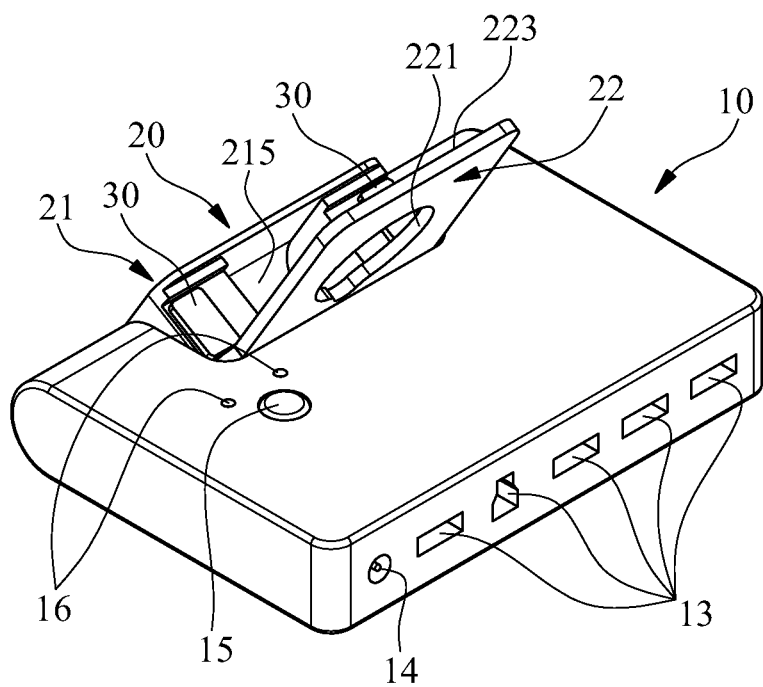
FIG. 8 is a rear view of FIG. 7.

With the illustrated embodiment, when it is desired to set the portable electronic device stand to the folded state, a user needs only to turn the mating part 20 relative to the U-shaped main body 10 until the back support 22 is moved into the receiving recess 11 on the bottom of the main body 10, as shown in FIGS. 3 to 5. The portable electronic device stand will have a minimal volume in the folded state. On the other hand, when it is desired to set the portable electronic device stand to the extended state for use, the user needs only to turn the mating part 20 relative to the U-shaped main body 10 in a reverse direction until the back support 22 is moved to lean against a rear side of the front receiving space 12 of the main body 10, as shown in FIGS. 6 to 8.

Figure 9:
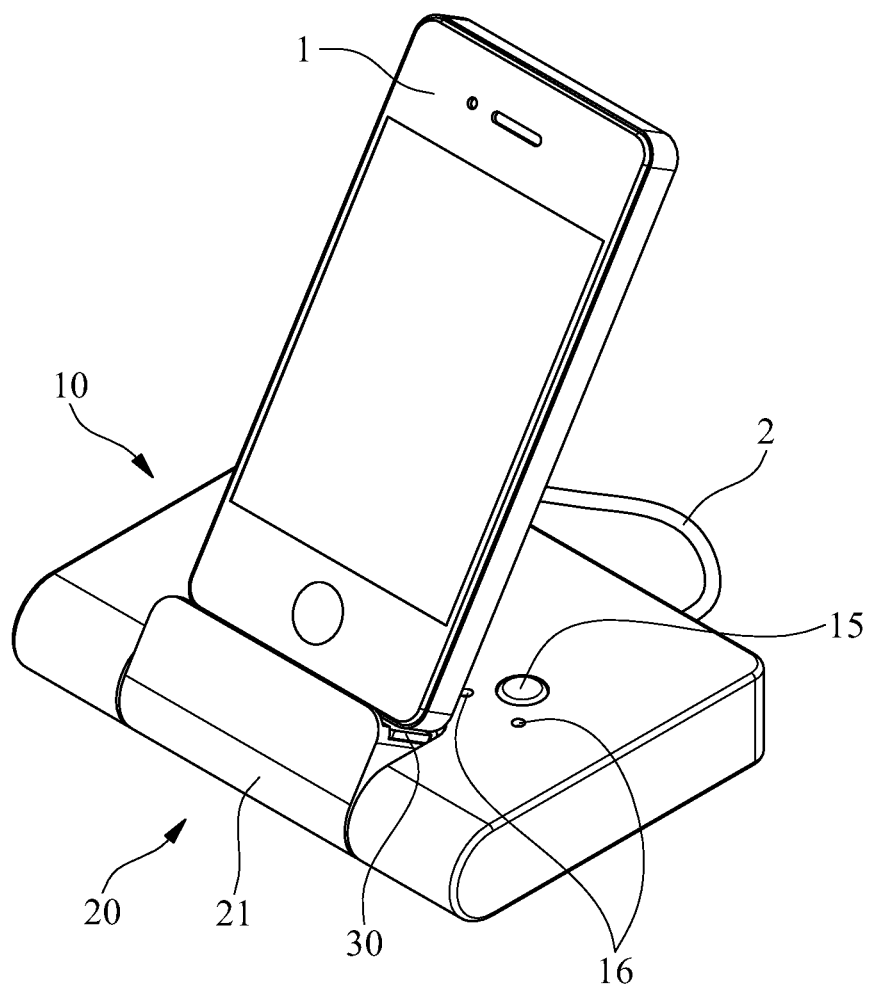
FIG. 9 shows the portable electronic device stand of FIG. 7 in use.
Figure 10:
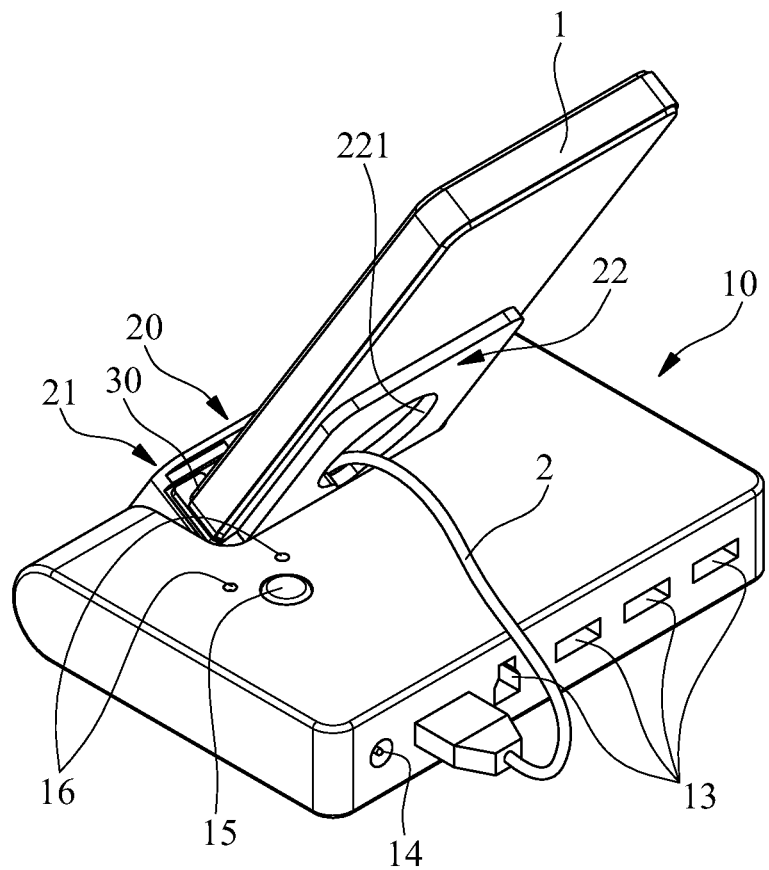
FIG. 10 is a rear view of FIG. 9.

As can be seen from FIG. 1, in the illustrated embodiment, the back support 22 has a through hole 221 formed thereon. When a portable electronic device 1 is placed on the extended portable electronic device stand, as shown in FIGS. 9 and 10, the portable electronic device 1 is seated on a carrying surface 213 of the seat portion 21 and leaned against a supporting surface 223 of the back support 22. A charging cable 2 can be extended through the back support 22 via the through hole 221 to connect an end to a bottom of the portable electronic device 1. Please also refer to FIG. 2. On the seat portion 21, there is provided a recession 215 for accommodating a connector of the charging cable 2 plugged in the bottom of the portable electronic device 1, so that the portable electronic device 1 with the charging cable 2 connected thereto can still be stably seated on the carrying surface 213.

As can be seen from FIGS. 5 and 6, the portable electronic device stand further includes anti-slip pads 30 attached to the bottom of the U-shaped main body 10, so that the portable electronic device stand positioned on a place does not arbitrarily slide in different directions. Further, as shown in FIG. 2, additional anti-slip pads 30 may also be attached to the carrying surface 213 of the seat portion 21 and the supporting surface 223 of the back support 22, so as to prevent the portable electronic device 1 placed on the stand from arbitrarily sliding in different directions.

In the illustrated embodiment, the U-shaped main body 10 is further provided with at least one connection port 13, which can be for example a USB 3.0 port or a USB 2.0 port, and a power jack 14. A power cord (not shown) having an end plugged into a wall socket can be connected at another end to the power jack 14 on the portable electronic device stand for supplying power to the portable electronic device stand, which may in turn serve as an adapter for supplying via the connection port 13 the power needed to charge the portable electronic device 1. The portable electronic device stand may further include at least one switch 15 for turning on or off the charging function, and at least one LED indicator 16. By providing LED indicators 16 of different colors, it is able to indicate whether the charging has been completed or not by lighting one of these LED indicators. For example, a lighting yellow LED indicator may indicate the portable electronic device 1 is being charged while a lighting green LED indicator may indicate the charging has been completed. With the color LED indicators 16, the user can be informed of the charging state in an eye-catching manner.

FIGS. 9 and 10 show the portable electronic device stand according to the present invention in use. As can be seen from FIG. 9, the portable electronic device stand enables the portable electronic device 1 positioned thereon to stand on a desk top and therefore be viewed or operated in a more convenient manner. The portable electronic device 1 can be a smartphone, a tablet computer or a personal digital assistant (PDA). And, the connection port 13 can further provide converted power supply to other electronic devices (not shown), such as a notebook computer, a digital camera, or an external hard disk drive.

In conclusion, by including a U-shaped main body and a mating part that pivotally turnably connected to each other, the portable electronic device stand according to the present invention can be folded into a minimal volume and can therefore be easily portable and convenient for storage.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A portable electronic device stand, comprising:
a U-shaped main body having an indented receiving recess formed on a bottom wall thereof and defining a front receiving space; and a mating part including a seat portion and a back support, which together giving the mating part a substantially L-shaped configuration; when the stand is in a receiving state the seat portion being hidden and faced to an inner wall of the U-shaped main body, and the back support being removably received in the receiving recess and flushed with the bottom wall of the main body; and when the stand is in an operation state, the seat portion and the back support are rotated and located above a top wall of the main body, wherein the back support having anti-slip pads attached to a supporting surface and contacted a back side opposed to a display of a portable electronic device which is supported by the seat portion.

2. The portable electronic device stand as claimed in claim 1, wherein the back support has a through hole formed thereon.

3. The portable electronic device stand as claimed in claim 1, wherein the seat portion has a recession provided thereon.

4. The portable electronic device stand as claimed in claim 1, further comprising anti-slip pads attached to the bottom of the U-shaped main body.

5. The portable electronic device stand as claimed in claim 1, further comprising anti-slip pads attached to a carrying surface of the seat portion.

6. The portable electronic device stand as claimed in claim 1, wherein the U-shaped main body has at least one connection port provided thereon.

7. The portable electronic device stand as claimed in claim 6, wherein the connection port can be any one of a USB 3.0 port and a USB 2.0 port.

8. The portable electronic device stand as claimed in claim 1, wherein the U-shaped main body has a power jack provided thereon.

9. The portable electronic device stand as claimed in claim 1, wherein the U-shaped main body has at least one switch provided thereon.

* * * * *